United States Patent [19]

St. Clair et al.

[11] 4,444,979

[45] Apr. 24, 1984

[54] POLYPHENYLENE ETHERS WITH IMIDE LINKING GROUPS

[75] Inventors: Terry L. St. Clair, Poquoson; Harold D. Burks, Newport News, both of Va.

[73] Assignee: The United States of America as represented by the Administrator of the National Aeronautics and Space Administration, Washington, D.C.

[21] Appl. No.: 469,866

[22] Filed: Feb. 25, 1983

[51] Int. Cl.³ .............................................. C08G 73/10
[52] U.S. Cl. .................................. 528/172; 528/125; 528/128; 528/185
[58] Field of Search ................ 528/125, 128, 172, 185

[56] References Cited

U.S. PATENT DOCUMENTS

| | | | |
|---|---|---|---|
| 3,933,749 | 1/1976 | Williams | 260/47 |
| 3,983,093 | 9/1976 | Williams et al. | 260/47 |
| 4,180,648 | 12/1979 | St. Clair et al. | 528/207 |
| 4,281,100 | 7/1981 | Takekoshi | 528/188 |

*Primary Examiner*—Lester L. Lee
*Attorney, Agent, or Firm*—Howard J. Osborn; John R. Manning; Wallace J. Nelson

[57] ABSTRACT

Novel polyphenylene ethers with imide linking units are disclosed. These polymers incorporate the solvent and thermal resistance of polyimides and the processability of polyphenylene ethers. Improved physical properties over those of the prior art are obtained by incorporating meta linked ethers and/or polyphenylene oxides into the polymer backbone. A novel process for making polymers of this type is also disclosed. The process is unique in that the expected need of high process temperatures and/or special atmospheres are eliminated.

8 Claims, No Drawings

POLYPHENYLENE ETHERS WITH IMIDE LINKING GROUPS

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

Aromatic polyimides (PI) are generally considered not readily processable via conventional thermoplastic or hot-melt techniques. These polymers are, however, exceptionally thermally stable as well as resistant to attack by solvents, and they exhibit high glass transition temperatures. Polymers of the polyphenylene oxide (PPO), polyphenylene sulfide (PPS), and polyphenylene sulfone (PPSO$_2$) classes are generally more processable than the polyimides by the thermoplastic or hot-melt techniques. However, all of these systems (referred to as PPX polymers hereinafter) are generally more susceptible to attack by solvents and have lower glass transition temperatures than polyimides. Thus, attempts have been made to incorporate the best attributes of both the PPX and PI systems into a single polymer system without the inherent drawbacks of either of the individual PPX or PI systems.

Williams, III, U.S. Pat. No. 3,933,749 attempts such a solution by incorporating sulfur linkages into a polyimide backbone. Takekoshi, U.S. Pat. No. 4,281,100 teaches the use of particulated oligomeric polyetherimide acids which may be converted to a high molecular weight polymer system by melt polymerization. Williams, III et al, U.S. Pat. No. 3,983,093 discloses the use of varied proportions of different polyetherimide segments in an attempt to reach the optimum balance between processability and solvent resistance. The polymers of the above cited patents, however, retained an undesirable level of susceptibility to attack by certain solvents. For instance, Williams, III et al, U.S. Pat. No. 3,983,093, col. 8, lines 25–31, discloses the solvent resistance of several polymers of that patent. Notably, relatively low solvent resistance was obtained in methylethyl ketone. Structurally, all of these polymer systems have employed para-oriented ether linkages and/or short phenylene oxide groups.

Furthermore, the processes employed to produce these polymers have required process conditions involving high temperatures, high pressures, and/or inert atmospheres. Such conditions obviously add to the cost of the process, and therefore to the cost of the final product. Thus, there is a definite need in the art for a polyether with imide linking units having high solvent and thermal resistance while retaining processablity. There is also a need in the art for a process for producing such a polymer which does not require severe reaction conditions.

Accordingly, an object of the present invention is to provide solvent resistant polyphenylene ethers.

Another object of the invention is to provide polyphenylene ethers with good thermal stability.

Yet another object is to provide polyphenylene ethers with imide linking units which are processable by hot melt techniques.

A further object is to provide polyphenylene ethers with imide linking units which are moldable by injection molding and general molding techniques.

Yet a further object is to provide polyphenylene ethers with imide linking units which may be used for adhesive bonding.

Another object is to provide polyphenylene ethers with imide linking units which may be made into films.

Another object is to provide polyphenylene ethers with imide linking units which may be used in coating or laminating applications.

An additional object is to provide a process for making polyphenylene ethers with imide linking units which may be carried out under ambient reaction conditions.

Another object is to provide a process for making polyphenylene ethers with imide linking units which yields a final product in an imidized fused-glass state.

SUMMARY OF THE INVENTION

According to the present invention, the foregoing and other objects are achieved by incorporating oxygen and/or sulfur and/or sulfone linking units between benzene or other aromatic ring systems in the backbone of aromatic, linear polyimides to yield linear polyphenylene ethers with imide linking units of the general formula PPX-PI. The PI portion of the polymer consists of meta linked diimides with two or more aromatic rings, or diimides having one or more phenylene oxide structures. This synthetic modification results in a class of polymers with improved thermoplastic and/or hot-melt flow properties over the base polyimide system. Additionally, the incorporation of the imide linking groups into the PPX system results in solvent resistant polymers which were previously soluble or swelled in common solvents.

These polymers of the PPX-PI type can be thermoplastically or hot-melt processed in the 250°–390° C. range in such a manner as to yield high quality, tough moldings; strong, solvent resistant adhesive bonds; and well formed films and laminates. Thermoplastic consolidation can be achieved in all cases below 250° C.

The polymers of the present invention are produced via a process which does not call for high temperatures or pressures or special atmosphere requirements. The process temperature for imidizing the amide acid units of the intermediate exceeds the glass transition temperature of the polymer, thus yielding the final polymer in a fused glass state which may be ground for further use as a molding powder.

DETAILED DESCRIPTION OF THE INVENTION

The general structure of the polymer system (PPX-PI) is:

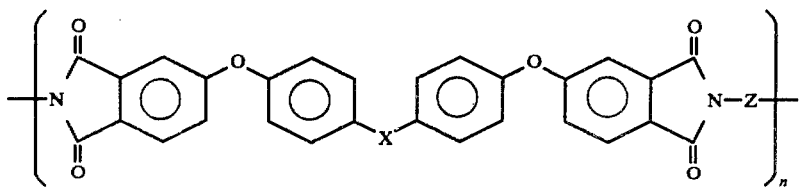

where n is greater than 10 and preferably at least 40; X is chosen from the group consisting of S, $SO_2$, O, C=O, and $CH_2$; and Z is of the formula:

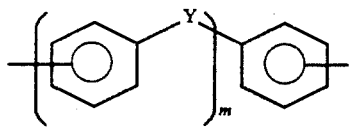

where m is between 1 and 10, inclusive, and Y is selected from the group consisting of S, $SO_2$, O, C=O, and $CH_2$.

Representative polymers were prepared according to the present invention by dissolving 4,4'-bis(3,4'-dicarboxyphenoxy)diphenylsulfide dianhydride (BDSDA) and a stoichimetric amount of the appropriate diamine in an aliphatic ether solvent such as bis(2-methoxyethyl)ether. Up to a 5% molar deficiency of diamine may be used to decrease the average molecular weight of the final product.

This solution is allowed to react with stirring for one to two hours in order to build up molecular weight. The poly(amide-acid) intermediate is then precipitated with a non-solvent (i.e., a liquid in which the poly(amide-acid) is not soluble) such as water, filtrated, and allowed to air dry overnight. The intermediate is further dried to drive off remaining volatiles at approximately 100° C. for one hour. At this point, the intermediate is imidized by raising the temperature to approximately 200° C. and holding at that temperature for approximately one hour to yield a polyphenylene ether with imide linking groups in a fused glass state.

Samples of three of the polymers of the present invention were prepared by reacting BDSDA with, respectively, 1,3-bis(aminophenoxy)benzene, 3,3'-diaminodiphenylsulfone, and 4,4'-diaminodiphenyl ether, yielding polymers of the following formulas:

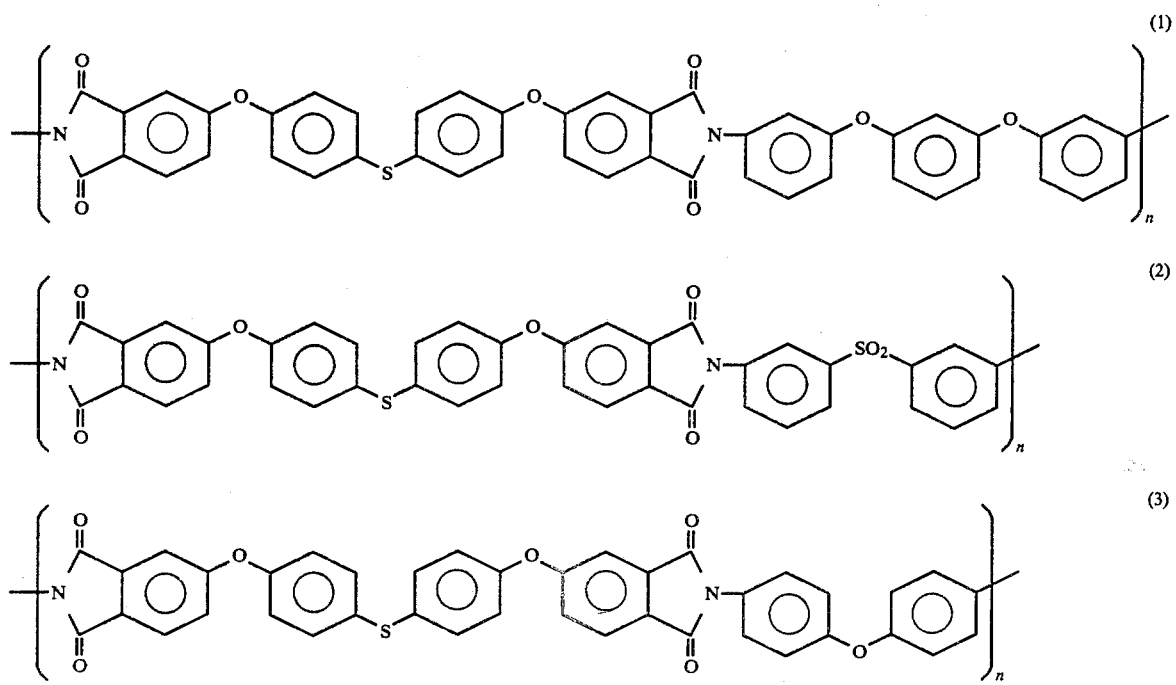

where n is approximately 20.

All three of the polymers were amorphous in nature and exhibited hot-melt flow.

Polymers of the following similar structures were also prepared for a comparison of physical properties:

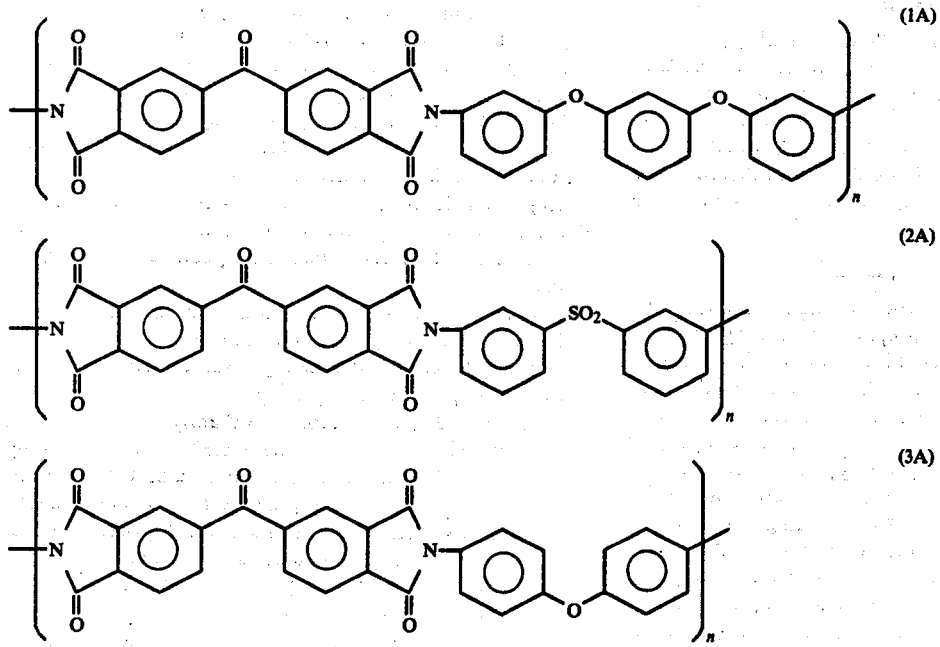

where n is approximately 20.

Polymers (1A) and (2A) exhibited some thermoplastic characteristics, but only limited hot-melt flow (i.e., the polymers were moldable but exhibited no capillary flow). Polymer (3A) has no thermoplastic or hot-melt flow characteristics.

When polymer powders of (1), (2), (3), (1A), (2A), and (3A) were subjected to conditions of 300° C. and 500 psi, polymers (1), (2) and (3) exhibited a high degree of melt-flow. For these three formulations, all of the resin flowed out of the mold. With polymers (1A) and (2A), however, the polymer powder softened just enough to fuse and yield transparent moldings. The polymer powder of (3A) did not soften enough to completely fuse, and the resulting solid was opaque and easily broken.

In order to obtain a more quantitative measure of the melt-flow properties of polymers (1), (2) and (3), they were examined by capillary rheometry. Both polymers (1) and (2) exhibited continuous flow at 350° C. under a constant strain rate of 0.404 sec$^{-1}$, while polymer (3) exhibited discontinuous flow at 390° C. at the same strain rate. The other three systems, as expected, would not flow.

The solvent resistance of polymers (1) and (2) was tested and found to be excellent as illustrated in Table I.

TABLE I

| Effect of Solvents PPX-PI Polymer Films | | |
|---|---|---|
| Solvent | Polymer (1) | Polymer (2) |
| methylethyl ketone | insoluble | insoluble |
| cyclohexanone | insoluble | insoluble |
| xylene | insoluble | insoluble |
| tricresylphosphate | insoluble | insoluble |
| cresol | swelling | swelling |
| methylenechloride | swelling | slight swelling |

These PPX-PI polymers were both unaffected by the first four solvents in the table. The PPX type polymers would generally all be dissolved by these solvents, especially cyclohexanone and tricresylphosphate. The cresol and methylene chloride which caused the PPX-PI polymers to swell are solvents for the PPX systems. Also, similar polymer systems in Williams, III et al, U.S. Pat. No. 3,983,093, showed low solvent resistance to methylethyl ketone and m-cresol.

Thus, a comparison of representative polymers of the present invention to the similar structures prepared demonstrates that a higher number of ether linkages in the PPX segment of the polymer promotes processability. Also, a comparison of representative polymers of the present invention with polymers of the prior art demonstrates that meta linkages in the PI segment improves flow properties. The combination of these two factors leads to an improved polymer system.

SPECIFIC EXAMPLES

Example I 11.000 g (0.02155 moles) of 4,4'-bis(3,4'-dicarboxyphenoxy)diphenylsulfide dianhydride (BDSDA) and 6.2999 g (0.02155 moles) of 1,3-bis(aminophenoxy)benzene (APB) were dissolved in 98.0 g of bis(2-methoxyethyl)ether at 250° C. in a flask equipped with magnetic stirring. This solution was allowed to stir for one hour in order to build up the molecular weight of the poly(amide-acid), at which time the inherent viscosity was determined to be 0.662 dl/g. This viscous polymer solution was poured into a mechanical blender containing distilled water at ambient temperature. The contact with water caused the poly(amide-acid) to precipitate, and the rotating blender blades chopped the precipitate into a fluffy consistency. The solid polymer was isolated by suction filtration and allowed to air dry at ambient conditions overnight. The air-dried polymer was then spread in a baking dish and placed in a forced air oven. The polymer was heated to 100° C. and held at this temperature for one hour to drive off residual water and solvent. The temperature was then increased to 200° C. and held at that temperature for one hour to effect conversion of the amide-acid units to imide units. The recovered polymer was in a fused glass state.

Example II

A polyphenylene ether with imide linking groups was made according to the procedure set forth in Example I, except as noted hereafter. The reactants and solvent were 11.0000 g (0.02155 moles) of BDSDA, 5.3406 g (0.02153 moles) of 3,3'-diaminodiphenylsulfone, and 92.6 g of bis(2-methoxyethyl)ether. The inherent viscosity of the poly(amide-acid) intermediate solution was 0.4 dl/g.

Example III

Unfilled moldings of the polymers resulting from Examples I and II were prepared according to the following procedure. Each of the fused glass polymers was ground into a powder state, placed in a matched metal molding die and preheated to 200° C. to form a series of varying thicknesses of molds of each polymer. A pressure of 200–300 psi was applied to effect consolidation, and this temperature and pressure were held for one-half hour. The mold and molding were then allowed to cool to approximately 100° C., and the molding was removed. All moldings made were transparent and flexible when prepared in discs of up to 0.050 inch thickness. Thicker moldings were also transparent, but the increased thickness (beyond 0.050 inch) decreased flexibility.

Example IV

Duplicate one-inch wide strips of 0.050 inch thick titanium alloy were grit-blasted with 120 mesh aluminum oxide and subsequently coated with the poly(amide-acid) intermediate of Example I or II. Several layers of the polymer were built up with a thermal treatment to 160° C. for 30 minutes between layers. This thermal treatment was performed to evaporate solvent and convert the amide-acid units to imide units. These strips were next overlapped 0.5 inch so that the adhesive layers met. A thin piece of woven glass cloth (0.004 inch thick) was inserted between the metal pieces to control the bond-line thickness. Pressure was applied (200 psi) and the sample was heated to 250°–275° C. at heating rates of 5° C. and 22° C. per minute to effect a bond between the metal strips. The system was cooled and the bonded strips of titanium were removed and tested according to ASTM D1002-72 for lap shear strength. Lap shear values of 40.3 MPa and 43.4 MPa, respectively, were obtained for the 5° C./min and 22° C./min samples. The values reported are the average of four sample test results.

It can thus be seen that the present invention yields polyphenylene ethers with imide linking groups that exhibit physical properties of processability, thermal resistance, and solvent resistance which make these polymers particularly well suited for a wide range of applications including adhesives, molding resins and laminating resins.

The above specific Examples are considered illustrative of the invention, and there may be modifications and variations therein that will be apparent to those skilled in the art without departing from the spirit and scope of the invention as set forth herein. For instance, in the examples bis(2-methoxyethyl)ether has been employed as a solvent, however, it is recognized that other aliphatic ether solvents such as tetrahydrofuran or dioxane could be substituted. Additionally, while water has been referred to as a precipitating agent for the intermediate polymer with amide-acid linking units, other nonsolvents such as methanol and heptane could also be employed. It therefore is to be understood that within the scope of the appended claims, the invention may be practiced otherwise than as specifically described herein.

What is claimed as new and desired to be secured by Letters Patent of the United States is:

1. A process for producing a solvent resistant, thermoplastic polymer comprising:
   mixing 1.00 part by mole of a dianhydride containing phenylether moieties with 0.95 to 1.00 parts by mole of an aromatic diamine in a solvent selected from the group of aliphatic ether solvents consisting essentially of bis(2-methoxyethyl)ether, tetrahydrofuran, and dioxane, at atmospheric pressure and at a temperature from 10° C. to 30° C.;
   stirring for one to two hours;
   pouring the resulting viscous solution into a non-solvent selected from the group consisting of water, methanol and heptane, to precipitate an intermediate polymer having amide-acid linking units;
   filtering to recover the intermediate polymer;
   drying the recovered intermediate polymer for 12 to 18 hours at ambient conditions and then for one-half to two and one-half hours at 90° C. to 110° C. and atmospheric pressure;
   imidizing the amide-acid units by subjecting the polymer to temperatures of 150° C. to 250° C. for one to five hours, such that the temperature exceeds the final polymer glass transition temperature, to yield a polyphenylene ether having imide linking groups in a fused glass state.

2. A process of making polyphenylene ethers with imide linking groups as in claim 1 wherein the dianhydride is 4,4'-bis(3,4'-dicarboxyphenoxy)diphenylsulfide dianhydride and the diamine is selected from the group consisting of:
   1,3-bis(aminophenoxy)benzene,
   3,3'-diaminodiphenylsulfone, and
   4,4'-diaminodiphenyl ether.

3. The process of claim 1 wherein the molar ratio of dianhydride to diamine is 1:1.

4. The process of claim 1 wherein the molar ratio of dianhydride is in excess to the diamine.

5. The process of claim 1 wherein the solvent is bis(2-methoxyethyl)ether.

6. The process of claim 2 wherein the diamine is 1,3-bis(aminophenoxy)benzene.

7. The process of claim 2 wherein the diamine is 3,3'-diaminodiphenylsulfone.

8. The process of claim 2 wherein the diamine is 4,4'-diaminodiphenyl ether.

* * * * *